(12) United States Patent
Lee et al.

(10) Patent No.: US 9,137,166 B2
(45) Date of Patent: Sep. 15, 2015

(54) IN-ORDER TRAFFIC AGGREGATION WITH REDUCED BUFFER USAGE

(75) Inventors: Daniel Sangyoung Lee, San Jose, CA (US); Yuen Fai Wong, San Jose, CA (US)

(73) Assignee: BROCADE COMMUNICATIONS SYSTEMS, INC., San Jose, CA (US)

( * ) Notice: Subject to any disclaimer, the term of this patent is extended or adjusted under 35 U.S.C. 154(b) by 486 days.

(21) Appl. No.: 12/695,401

(22) Filed: Jan. 28, 2010

(65) Prior Publication Data

US 2011/0182294 A1  Jul. 28, 2011

(51) Int. Cl.
*H04L 12/801* (2013.01)

(52) U.S. Cl.
CPC ...................... *H04L 47/34* (2013.01)

(58) Field of Classification Search
None
See application file for complete search history.

(56) References Cited

U.S. PATENT DOCUMENTS

| | | | |
|---|---|---|---|
| 5,777,987 A * | 7/1998 | Adams et al. | 370/336 |
| 6,137,795 A * | 10/2000 | Tominaga et al. | 370/375 |
| 6,608,813 B1 * | 8/2003 | Chiussi et al. | 370/218 |
| 6,621,796 B1 * | 9/2003 | Miklos | 370/236 |
| 6,628,641 B1 * | 9/2003 | Strawczynski et al. | 370/474 |
| 6,671,275 B1 | 12/2003 | Wong | |
| 6,728,861 B1 * | 4/2004 | Roach et al. | 711/220 |
| 6,901,072 B1 | 5/2005 | Wong | |
| 7,187,687 B1 | 3/2007 | Davis | |
| 7,203,194 B2 | 4/2007 | Chang | |
| 7,206,283 B2 | 4/2007 | Chang | |
| 7,236,490 B2 | 6/2007 | Chang | |
| 7,266,117 B1 | 9/2007 | Davis | |
| 7,333,489 B1 * | 2/2008 | Nelson et al. | 370/392 |
| 7,356,030 B2 | 4/2008 | Chang | |
| 7,468,975 B1 | 12/2008 | Davis | |
| 7,512,127 B2 | 3/2009 | Chang | |
| 7,596,139 B2 | 9/2009 | Patel | |
| 7,636,369 B2 | 12/2009 | Wong | |
| 7,649,885 B1 | 1/2010 | Davis | |
| 7,738,450 B1 | 6/2010 | Davis | |
| 7,760,636 B1 * | 7/2010 | Cheriton | 370/235 |
| 7,787,446 B2 * | 8/2010 | Le Maut et al. | 370/387 |
| 7,813,367 B2 | 10/2010 | Davis | |
| 7,817,659 B2 | 10/2010 | Wong | |
| 7,903,654 B2 | 3/2011 | Bansal | |
| 7,948,872 B2 | 5/2011 | Patel | |
| 7,978,614 B2 | 7/2011 | Wong | |
| 7,978,702 B2 | 7/2011 | Chang | |
| 7,995,580 B2 | 8/2011 | Patel | |
| 8,037,399 B2 | 10/2011 | Wong | |

(Continued)

*Primary Examiner* — Timothy J Weidner
(74) *Attorney, Agent, or Firm* — Shun Yao; Park, Vaughan, Fleming & Dowler LLP

(57) ABSTRACT

One embodiment provides a system that performs in-order traffic aggregation from a number of low-speed ports to a high-speed port. During operation, the system receives at a low-speed port a packet, stores it in a store-and-forward FIFO associated with the low-speed port, extracts a sequence number associated with the stored packet, and stores the extracted sequence number in a sequence-number FIFO associated with the low-speed port. The system further generates an expected sequence number, which maintains a linear order with respect to sequence numbers associated with previously forwarded packets, and determines whether a front end of the sequence-number FIFO matches the expected sequence number. If so, the system removes the front end of the sequence-number FIFO buffer, retrieves a packet associated with it, forwards the retrieved packet on the high-speed port, and updates the expected sequence number by adding 1 to the packet number of the retrieved packet.

24 Claims, 10 Drawing Sheets

(56) References Cited

U.S. PATENT DOCUMENTS

| | | | |
|---|---|---|---|
| 8,144,711 B1 * | 3/2012 | Pegrum et al. | 370/394 |
| 8,149,839 B1 | 4/2012 | Hsu | |
| 8,155,011 B2 | 4/2012 | Wong | |
| 8,170,044 B2 | 5/2012 | Davis | |
| 8,194,666 B2 | 6/2012 | Davis | |
| 8,271,859 B2 | 9/2012 | Wong | |
| 8,483,222 B1 * | 7/2013 | Ofelt et al. | 370/394 |
| 2002/0075873 A1 * | 6/2002 | Lindhorst-Ko et al. | 370/394 |
| 2002/0118692 A1 * | 8/2002 | Oberman et al. | 370/419 |
| 2003/0123481 A1 * | 7/2003 | Neale et al. | 370/466 |
| 2003/0156538 A1 * | 8/2003 | Lebizay et al. | 370/231 |
| 2003/0223433 A1 * | 12/2003 | Lee et al. | 370/395.52 |
| 2003/0231583 A1 * | 12/2003 | Boduch et al. | 370/219 |
| 2004/0057434 A1 * | 3/2004 | Poon et al. | 370/392 |
| 2004/0078494 A1 * | 4/2004 | Lennox et al. | 710/1 |
| 2004/0141510 A1 * | 7/2004 | Blanc et al. | 370/401 |
| 2004/0190555 A1 * | 9/2004 | Meng | 370/474 |
| 2005/0190697 A1 * | 9/2005 | Dohi et al. | 370/235 |
| 2005/0201379 A1 * | 9/2005 | Zhang et al. | 370/395.1 |
| 2007/0110087 A1 * | 5/2007 | Abel et al. | 370/412 |
| 2008/0049774 A1 * | 2/2008 | Swenson et al. | 370/412 |
| 2009/0310485 A1 * | 12/2009 | Averi et al. | 370/232 |
| 2011/0116443 A1 * | 5/2011 | Yu et al. | 370/328 |

* cited by examiner

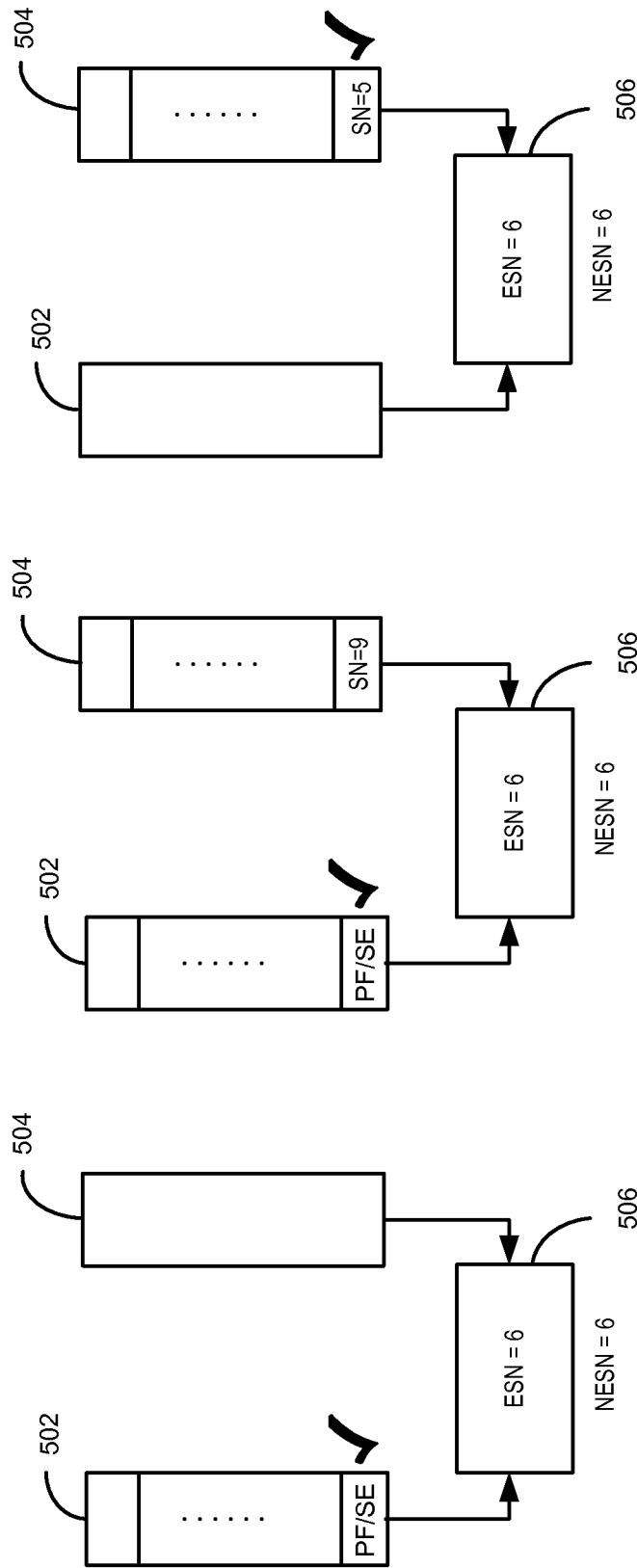

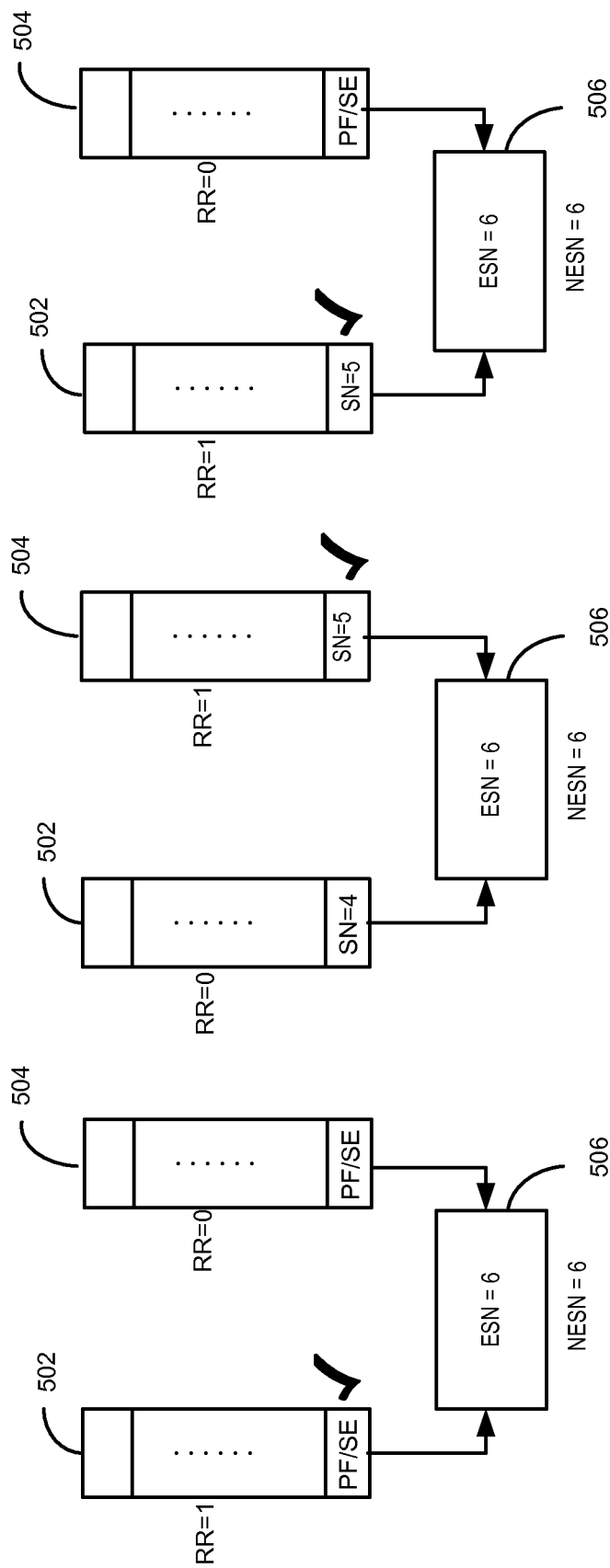

IN-ORDER TRAFFIC AGGREGATION WITH REDUCED BUFFER USAGE

BACKGROUND

1. Field

The present disclosure relates to communication networks. More specifically, the present disclosure relates to a method and system for facilitating in-order traffic aggregation.

2. Related Art

The proliferation of the Internet and e-commerce continues to fuel evolutions in the telecom and network industries. Convergence in the underlying network architectures often takes place at a pace faster than the lifespan of most network equipment. For example, a large enterprise network today may contain Internet Protocol (IP) networks, storage area networks (SANs), Ethernet-based access networks, and leased lines and switches from telephone service providers. How to manage and fully utilize the equipment capacity in a heterogeneous environment remains an ongoing challenge.

To maximize returns on capital expenditures, many network architects prefer re-using existing equipment to switch data packets of different formats and aggregating low-speed switch ports to provision high-speed logical links. To achieve such a goal, I/O consolidation is needed. I/O consolidation is the ability to carry different types of traffic, having different traffic characteristics and handling requirements, over the same physical media.

In storage networking, Fibre Channel (FC) is the most widely used protocol, thus making FC an essential component in I/O consolidation solutions for data centers. Fibre Channel over Ethernet (FCoE) allows FC type of traffic to be transported over an Ethernet network. Hence, an Ethernet network can be used in a data center for consolidating flows from FC and Internet Protocol (IP), as well as other types of traffic. As a result, the different types of traffic can share a single, integrated infrastructure, thereby reducing network complexities in the data center.

To enable FCoE, FC frames can be encapsulated inside an Ethernet frame to allow them to be transported across the Ethernet network. In order to encapsulate/decapsulate FC frames, certain processing circuitry is needed. Sometimes, a mismatch may occur between the speed of an Ethernet link and the speed of the processing circuitry interface. To overcome such a mismatched condition, the Ethernet packet may arrive at the processing circuitry via multiple low-speed input ports. The processing circuitry processes the received packets and forwards them to corresponding FC ports. Because the Ethernet packet size can vary from 64 bytes to up to 1518 bytes, the packets received from the multiple low-speed input ports may be processed and forwarded out of order.

To re-sequence the packets, a conventional approach is to attach a packet sequence number to each Ethernet packet and place received packets into a large memory. A resequencing mechanism then re-orders the packet flow within the large memory based on the packet sequence number. Such an approach relies on a memory that is large enough to buffer many packets, such as hundreds of Ethernet packets. However, such a large-sized memory may not be available inside the processing circuitry.

SUMMARY

One embodiment of the present invention provides a system that performs in-order traffic aggregation from a number of low-speed ports to a high-speed port. During operation, the system receives at a low-speed port a packet, stores the packet in a store-and-forward first-in-first-out (FIFO) buffer associated with the low-speed port, extracts a sequence number associated with the stored packet, and stores the extracted sequence number in a sequence-number FIFO buffer associated with the low-speed port. The system further generates an expected sequence number, which maintains a linear order with respect to sequence numbers associated with previously forwarded packets, and determines whether a front end of the sequence-number FIFO buffer matches the expected sequence number. If so, the system removes the front end of the sequence-number FIFO buffer, retrieves a packet associated with the removed front end of the sequence-number FIFO buffer, forwards the retrieved packet on the high-speed port, and updates the expected sequence number by adding 1 to the packet number of the retrieved packet.

In a variation on this embodiment, in response to the front end of the sequence-number FIFO buffer not matching the expected sequence number, the system determines whether a front end of another sequence-number FIFO buffer matches the expected sequence number.

In a further variation, in response to no match being found between the front ends of all sequence-number FIFO buffers and the expected sequence number, the system determines whether a timeout event has occurred associated with the sequence-number FIFO buffer. If so, the system removes the front end of the sequence-number FIFO buffer, retrieves a packet associated with the removed front end of the sequence-number FIFO buffer, and forwards the retrieved data packet on the high-speed port.

In a further variation, the timeout event comprises at least one of the following: a waiting time exceeds a predetermined amount, a sequence-number FIFO buffer exceeds a predetermined threshold, and a store-and-forward FIFO buffer exceeds a predetermined threshold.

In a further variation, in response to no match being found between the front ends of all sequence-number FIFO buffers and the expected sequence number, the system determines whether the front ends of all sequence-number FIFO buffers are larger than the expected sequence number. If so, the system removes the smallest sequence number from the corresponding sequence-number buffer, forwards a packet associated with the smallest sequence number and updates the expected sequence number by adding 1 to the packet number of the retrieved packet.

In a variation on this embodiment, the system further determines whether the received packet contains an error and/or the received packet is a flow-control packet. If so, the system forwards the received packet on the high-speed port, and keeps the expected sequence number unchanged.

In a further variation, the error includes at least one of: sequence number invalid, packet header checksum error, sequence number parity error, and sequence number smaller than expected sequence number.

In a further variation, the system forwards the received error packet and/or flow-control packet in a round-robin fashion among a number of low-speed ports.

In a variation on this embodiment, the system further determines whether an end-of-frame (EOF) field of the packet is received. The system stores the packet-sequence number after the EOF field is received.

BRIEF DESCRIPTION OF THE FIGURES

This disclosure is illustrated by way of example and not by way of limitation in the accompanying drawings. Like reference numerals refer to similar elements.

FIGS. 5B-5I present a number of exemplary scenarios illustrating how the system handles exceptions in accordance with embodiments of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

Embodiments of the present invention provide a system that can reduce the amount of buffer used during in-order traffic aggregation. During operation, the system receives packets from multiple-speed ports and buffers the received packets into corresponding store-and-forward first-in-first-out (FIFO) buffers associated with each low-speed port. Subsequent to a packet being received completely, the system sends its sequence number to a corresponding sequence-number FIFO buffer. The system includes an expected-sequence-number generator that generates an expected next sequence number. By matching the front end of a particular sequence-number FIFO buffer, the system arbitrates which packet in the store-and-forward FIFO buffers is the packet expected to be forwarded on a high-speed port. Hence, the system does not need to rely on a large memory to buffer large numbers of packets in order to extract a packet with a correct sequence number to forward. The system also includes a timeout mechanism to deal with a situation where no match is found.

In this disclosure, the term "edge device" is loosely defined and, in general, refers to a network device that is situated between an end-user device and a switch or traffic aggregation equipment situated closer to the core of the network. An edge device can also provide switching functions. The terms "low-speed" and "high-speed" do not specify any particular speed, but are meant to denote a relative difference between the speeds of the ports. In addition, although the term "packet" is used in the present description, embodiments of the present invention are not limited to networks where groups of bits are referred to as "packets" (such as IP networks). Embodiments of the present invention can be applied to any type of networks, where groups of bits can be referred to as "frames," "cells," or "datagrams."

FCoE Implementation

Figure 1:
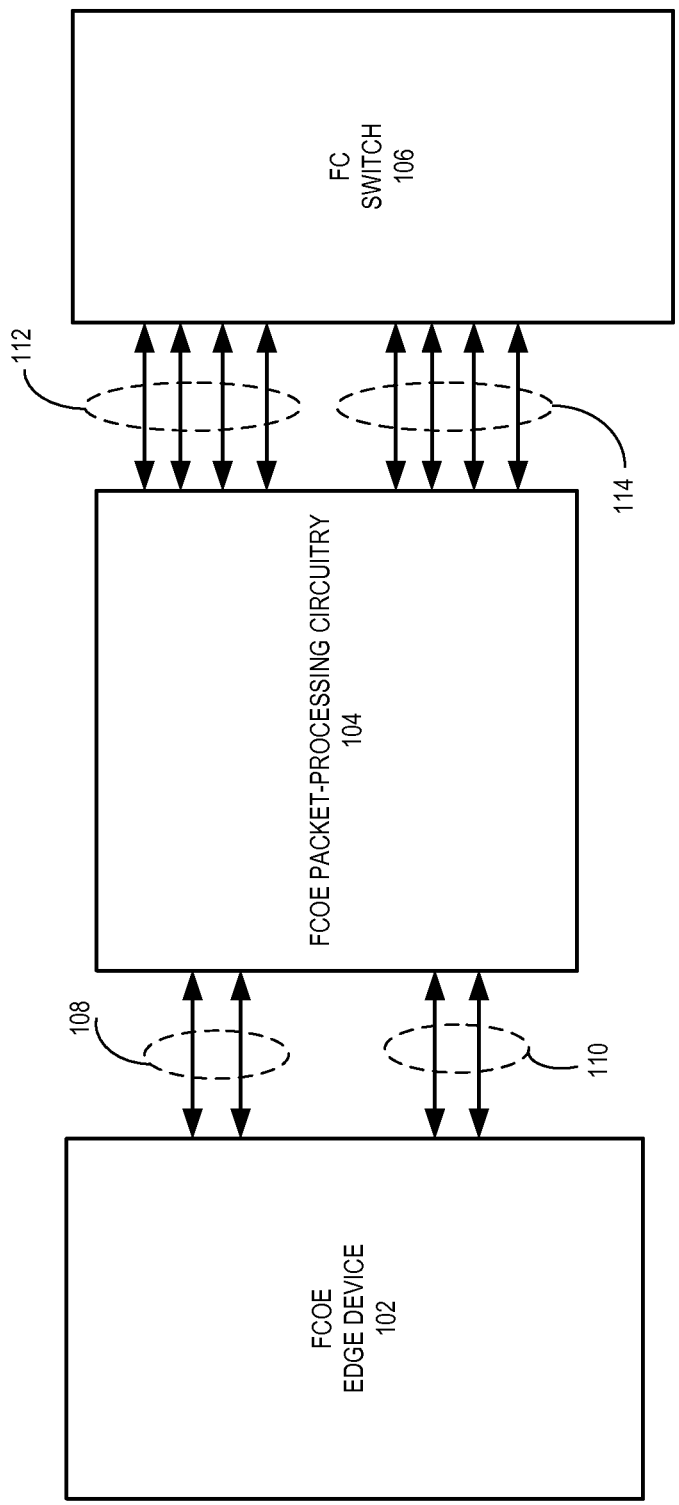
FIG. 1 presents a diagram illustrating the architecture of an exemplary system that implements FCoE in accordance with an embodiment of the present invention.

FIG. 1 presents a diagram illustrating the architecture of an exemplary system that implements FCoE in accordance with an embodiment of the present invention. The FCoE system includes an FCoE edge device 102, an FCoE packet-processing circuitry 104, and an FC switch 106. FCoE edge device 102 interfaces with external Ethernet network by receiving and transmitting packets in Ethernet format. FCoE packet-processing circuitry 104 encapsulates FC frames to FCoE frames to allow it to be transported across Ethernet network, and decapsulates FCoE frames to FC frames to allow them to be switched by FC switch 106, which operates on an FC frame format.

FCoE packet-processing circuitry 104 is coupled to FCoE edge device 102 via a number of trunked Ethernet links, including Ethernet trunks 108 and 110. In one embodiment, each Ethernet trunk is formed by combining a number of low-bandwidth links. For example, two 5 Gbps Ethernet links can be combined to form a single 10 Gbps trunk in order to provide bandwidth for sustained traffic from a single 10 Gbps flow on a front end port of FCoE edge device 102. FCoE packet-processing circuitry 104 is coupled to FC switch 106 via a number of trunked FC links, including FC trunks 112 and 114. Control logic in FCoE packet-processing circuitry 104 picks which FC trunk to send a frame to based on the amount of space available in the downstream FIFO. This allows the control logic to make the best possible utilization of the two available FC trunks for forwarding the received FCoE frame. FCoE packet-processing circuitry 104 can be implemented using various techniques, such as application-specific integrated circuits (ASIC) and field-programmable gate arrays (FPGA). In one embodiment, FCoE packet-processing circuitry 104 is implemented using an FPGA technique.

Figure 2A:
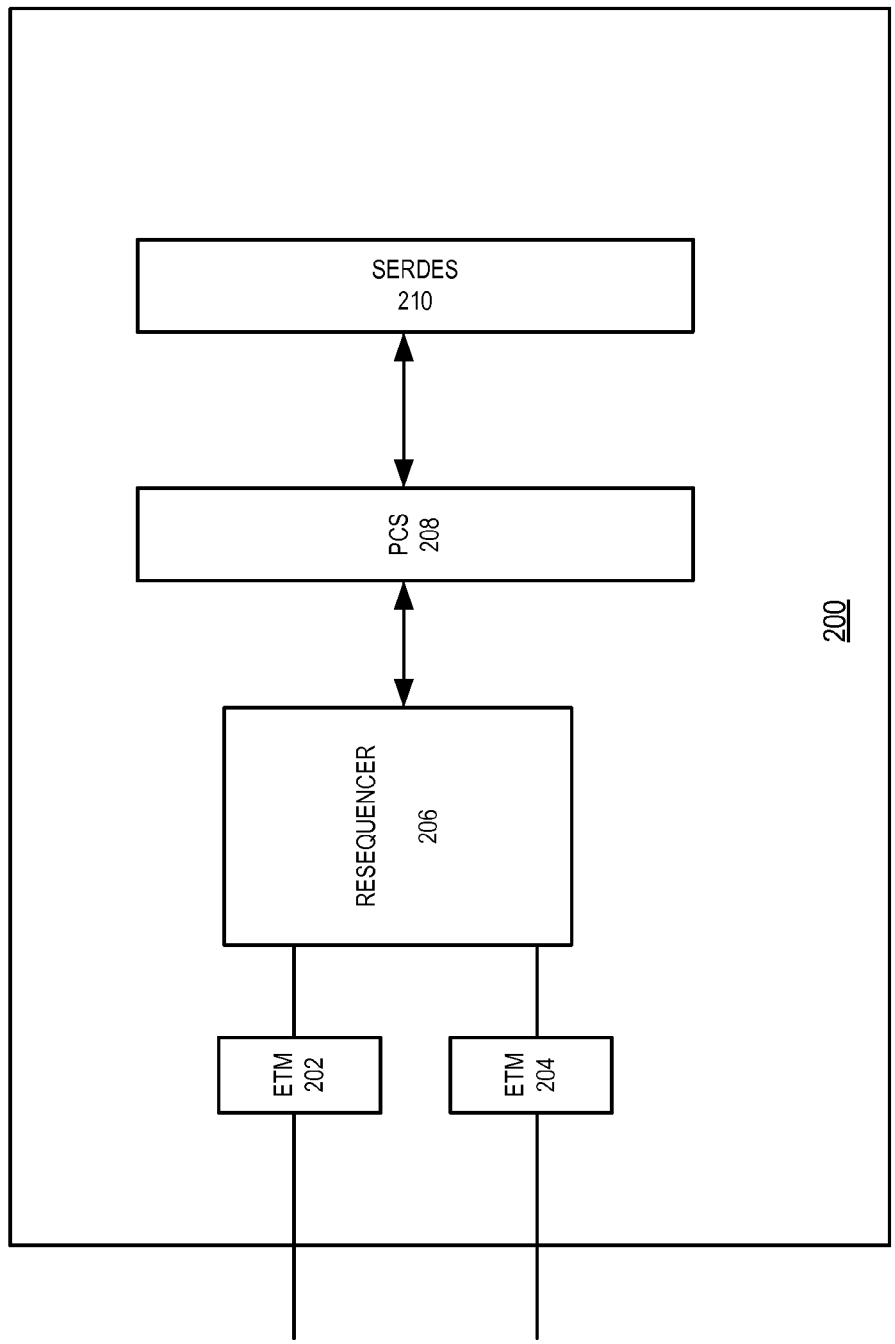
FIG. 2A presents a diagram illustrating the architecture of an exemplary Ethernet Media-Access-Control (MAC) trunk module in accordance with an embodiment of the present invention.

In order to realize link aggregation at the Ethernet trunk, packet resequencing is needed at the front end (the side facing the FCoE edge device) of FCoE packet-processing circuitry. FIG. 2A presents a diagram illustrating the architecture of an exemplary Ethernet Media-Access-Control (MAC) trunk module in accordance with an embodiment of the present invention. Ethernet MAC trunk module 200 includes two Ethernet MAC (ETM) interfaces 202 and 204, a packet resequencer 206, a physical coding sublayer (PCS) module 208, and a serializer/deserializer (SERDES) 210.

ETM interfaces 202 and 204 both have a bandwidth of 5 Gbps. During operation, FCoE frames are forwarded from an FCoE edge device to these two interfaces. In one embodiment, ETM interfaces 202 and 204 are coupled to corresponding MAC interfaces on the FCoE edge device. To facilitate in-order packet forwarding, in one embodiment, the FCoE edge device is configured to attach each FCoE frame with additional packet sequence numbers according to the sequence in which they arrive at the FCoE edge device. In some embodiments, a sequence number is assigned to an incoming Ethernet frame at an edge device based on: (1) the frame's priority, (2) the ingress edge device, and (3) the external egress port on an egress edge device. In other words, a sequence number for a frame is substantially unique among other frames with the same priority, ingress edge device, and external egress port.

Figure 2B:
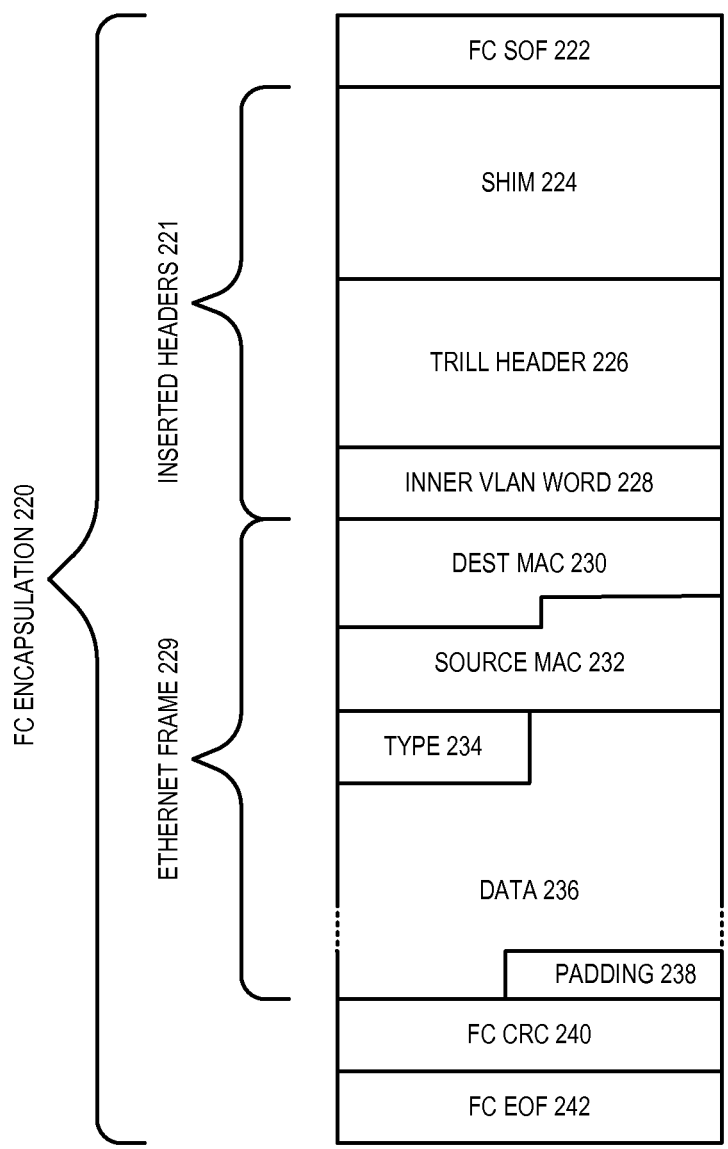
FIG. 2B illustrates an exemplary frame format which includes shim headers in accordance with an embodiment of the present invention.

FIG. 2B illustrates an exemplary frame format which includes shim headers in accordance with an embodiment of the present invention. In this example, an FC-encapsulated frame 220 includes the FC headers, a number of inserted headers 221, and an Ethernet frame 229. The FC headers include an FC start-of-frame (SOF) field 222, an FC checksum (cyclic-redundancy-check, or "CRC") field 240, and an FC end-of-frame (EOF) field 242. Ethernet frame 229 can include a destination Medium Access Control (MAC) address 230, a source MAC address 232, an Ethertype field 234, Ethernet data 236, and a padding field 238.

Inserted headers 221 include a shim header 224 and, optionally, a TRILL (Transparent Interconnection of Lots of Links) header 226 and an inner virtual LAN (VLAN) word 228. Shim header 224 can include a sequence number which is used by the edge device to re-order received frames. Shim header 224 can include additional information to facilitate the routing and forwarding operations at the FC switch. In one embodiment, shim header 224 includes FC address information. Note that the core switching devices can be based on other formats than FC. Correspondingly, shim header 224 can include routing information associated with different formats.

TRILL header 226 can facilitate link-state routing with Ethernet frames. More details of the TRILL protocol can be found at the web page of the Internet Engineering Task Force (IETF) VLAN word 228 allows various end devices to form a virtual LAN. Note that both TRILL header 226 and VLAN word 228 are optional.

In some embodiments, data portion 236 of Ethernet frame 229 can encapsulate Fibre Channel over Ethernet (FCoE) content. In this case, Ethertype field 234 carries a special value that indicates that the content in data field 236 carries an encapsulated FC frame. Note that the FCoE in data field 236 is separate from FC encapsulation 220.

Figure 2C:
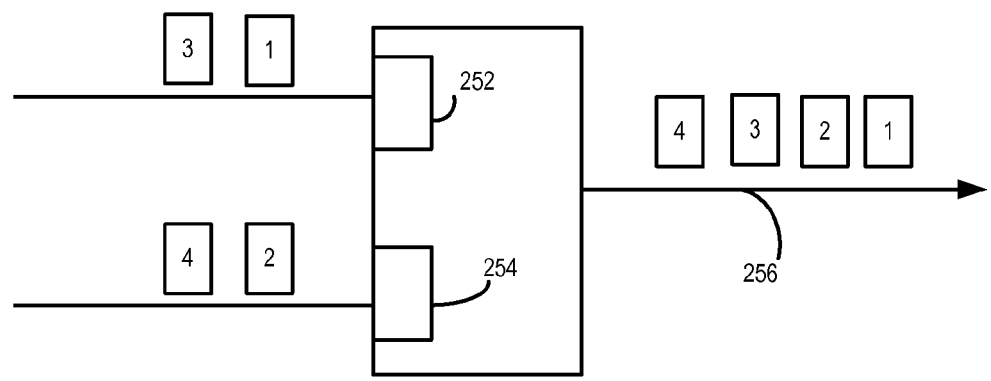
FIG. 2C presents a diagram illustrating an exemplary scenario where short packets are aggregated and forwarded in order.
Figure 2D:
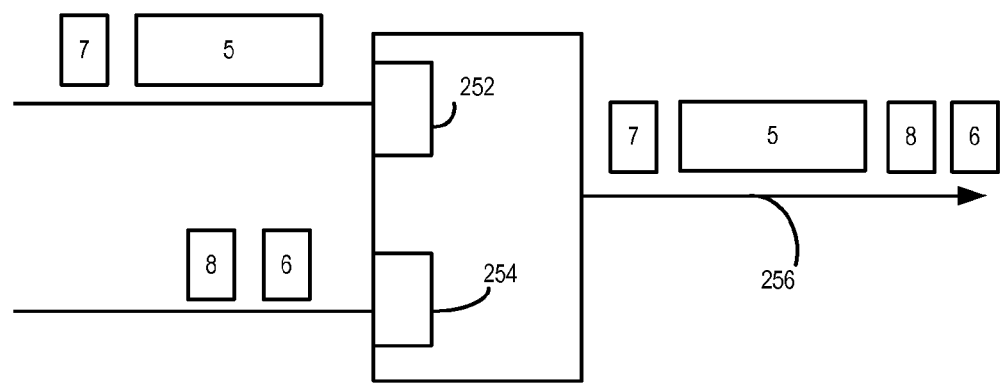
FIG. 2D presents a diagram illustrating an exemplary scenario where a mixture of short packets and long packets are aggregated and forwarded out of order.

The FCoE edge device is configured to forward the FCoE frames to ETM trunk module 200 following an order based on the packet sequence number. As a result, the FCoE frames arrives at ETM interfaces 202 and 204 sequentially. Ideally, when being forwarded to PCS module 208 on a 10 G link, the FCoE frames can retain their order. However, due to the variation of frame lengths (or packet sizes), the FCoE frames arriving at ETM interfaces 202 and 204 may experience different amounts of delay, thus resulting in frames being forwarded out of order. FIGS. 2C-2D can better explain how packets may be out of order when aggregated from low-speed links to a high-speed link.

FIG. 2C presents a diagram illustrating an exemplary scenario where short packets are aggregated and forwarded in order. In FIG. 2C, a number of FCoE packets arrive at 5 G ETM interfaces 252 and 254. Packets 1 through 4 are short packets, and they arrive at and pass ETM interfaces 252 and 254 alternately. As one can see on the right side of the figure, when they are forwarded on the 10 G link 256, they are able to stay in order.

FIG. 2D presents a diagram illustrating an exemplary scenario where a mixture of short packets and long packets are aggregated and forwarded out of order. In the scenario shown in FIG. 2C, packets 5 through 8 arrive at 5 G ETM interfaces 252 and 254. Packet 5, which is sent to interface 252, is a long packet, thus generating a long delay at interface 252. In the meantime, packets 6 and 8, which are sent to interface 254, are short packets, thus passing interface 254 with a relatively short delay. As a result, when the packets are forwarded on the 10 G link 256, packets 6 and 8 are forwarded before packets 5 and 7.

To avoid out-of-order forwarding, embodiments of the present invention utilize a packet-resequencing mechanism located between the ETM interfaces and the PCS module (such as resequencer 206 shown in FIG. 2A). The packet resequencer is configured to arbitrate the forwarding sequence of packets arriving from multiple low-speed links to make sure that the packets are forwarded based on the order of their packet sequence number.

Packet Resequencer

Figure 3:
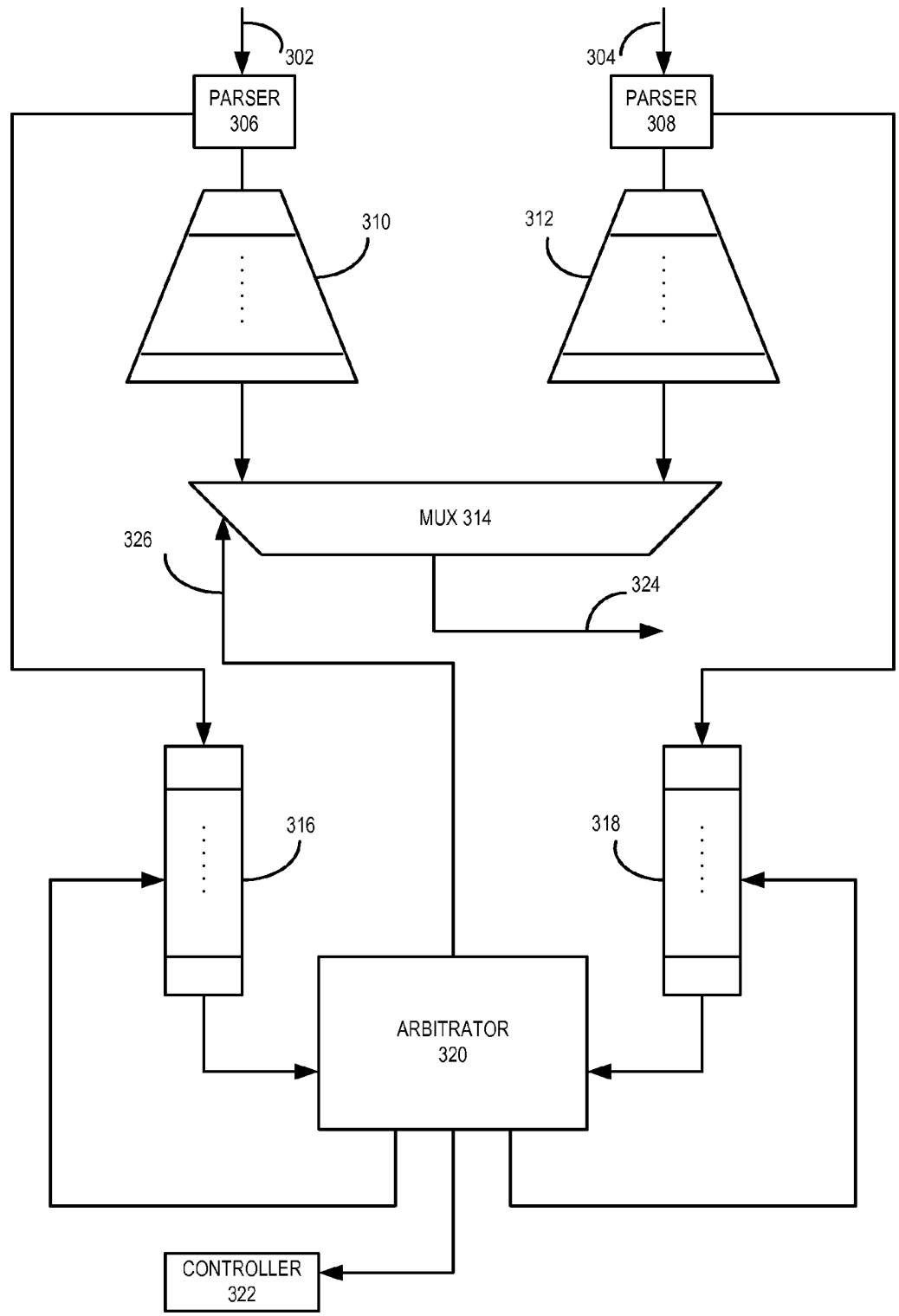
FIG. 3 presents a block diagram illustrating the structure of an exemplary packet-resequencing mechanism in accordance with an embodiment of the present invention.

FIG. 3 presents a block diagram illustrating the structure of an exemplary packet-resequencing mechanism in accordance with an embodiment of the present invention. Packet-resequencing mechanism 300 includes a number of low-speed interfaces including interfaces 302 and 304; a number of packet parsers including parsers 306 and 308; a number of store-and-forward FIFO buffers including buffers 310 and 312, each dedicated a low-speed interface; a multiplexer/selector (MUX) 314; a number of sequence-number FIFO buffers including buffers 316 and 318, each dedicated to a low-speed interface; an arbitrator 320; an arbitrator controller 322; and a high-speed interface 324.

During operation, FCoE packets arriving at low-speed interfaces 302 and 304 are sent to packet parsers 306 and 308, respectively. As a received FCoE packet is being written into a store-and-forward buffer dedicated to the interface receiving the packet, the corresponding packet parser converts the packet from a lower bit width to a higher bit width. For example, low-speed (such as 5 Gbps) interface 302 can receive a 32-bit wide packet, and as the 32-bit wide packet is written into store-and-forward FIFO buffer 310, packet parser 306 converts the 32-bit wide packet into a 64-bit (or 72-bit wide) packet. Note that the conversion is to accommodate the speed of high-speed (such as 10 Gbps) interface 324, on which the packet is forwarded.

In addition to packet-width conversion, each packet parser is configured to parse the FCoE packet header (including both the FC headers and inserted headers 221) to identify runt packets and special flow-control packets, such as a PAUSE packet, and runt packets. Packet parsers 306 and 308 also extract packet sequence numbers and a sequence number valid bit from shim header 224. Upon the completion of writing a packet into a corresponding storing-and-forward FIFO buffer, or upon receiving the EOF field of the packet header, the packet parser writes information extracted from the FCoE packet header into a corresponding packet sequence-number FIFO buffer. Information extracted from a FCoE packet header includes, but is not limited to: packet sequence number; sequence number valid bits; possible error message, such as an error message indicating a checksum error within the shim header; and messages indicating the packet is a special flow control message. For example, upon receipt of the EOF field of a received packet, packet parser 306 writes the extracted packet sequence number and the sequence number valid bit into dedicated sequence-number FIFO buffer 316. Note that, because both the store-and-forward FIFO buffers and the sequence-number FIFO buffers are initially empty, when a packet arrives at the head of a store-and-forward FIFO buffer, its sequence number also arrives at the head of the corresponding sequence-number FIFO buffer.

Arbitrator 320 is configured to generate an expected sequence number based on previously forwarded packets and compare the generated sequence number with the heads (or front end) of all sequence-number FIFO buffers which are coupled to arbitrator 320. For example, if the packet sequence number of a most recently forwarded packet is n, then the expected sequence number generated by arbitrator 320 will be n+1. In other words, in order to maintain the order of the packets, the next packet to be forwarded on high-speed interface 324 needs to have a sequence number of n+1.

Arbitrator 320 checks the heads (or front ends) of packet number sequence FIFO buffers 316 and 318, and compares them with the expected sequence number. If a match is found, arbitrator 320 removes the matched sequence number from the sequence-number FIFO buffer and generates a control signal 326, which is fed to MUX 314, thus causing a packet associated with the matched sequence number to be output from MUX 314 and to be forwarded on high-speed interface 324. In other words, arbitrator 320 arbitrates which store-and-forward FIFO buffer can forward its head on high-speed interface 324. For example, in one scenario, the expected sequence number generated by arbitrator 320 is n+1, the heads of packet sequence-number FIFO buffers 316 and 318 are n+1 and m, respectively. Consequently, arbitrator 320 matches the head of sequence-number FIFO buffer 316 with the expected sequence number and removes it from FIFO 316. At the same time, arbitrator 320 generates control signal 326 causing MUX 314 to select the output from the store-and-forward FIFO buffer. Subsequently, arbitrator 320 updates the expected sequence number by incrementing it by 1 and selects a next packet to be forwarded on high-speed interface 324.

Arbitrator controller 322 controls the operation of arbitrator 320. More specifically, controller 322 controls how arbitrator 320 handles exceptions, which are special scenarios when arbitrator 320 fails to find a head of sequence-number FIFO buffer that matches the expected sequence number.

Figure 4A:
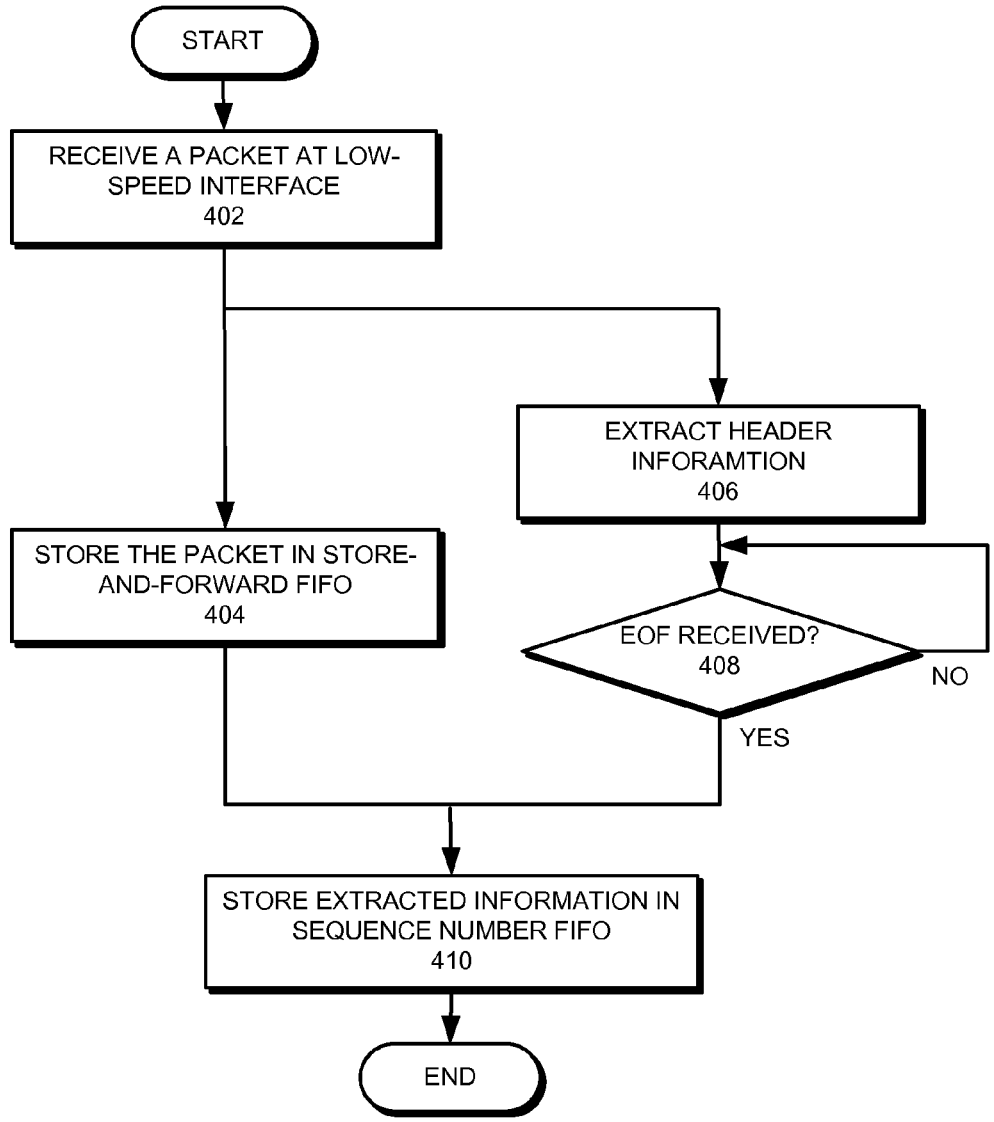
FIG. 4A presents a flow chart illustrating a packet receiving and buffering process for in-order packet forwarding in accordance with an embodiment of the present invention.

FIG. 4A presents a flow chart illustrating a packet receiving and buffering process for in-order packet forwarding in accordance with an embodiment of the present invention. During operation, the system receives packets at the low-speed interface (operation 402). The system stores the received packets into corresponding store-and-forward FIFO buffers (operation 404). In one embodiment, each low-speed interface is assigned a store-and-forward FIFO buffer configured to store the packet received on that interface. In the meantime, the system extracts information from the packet header (operation 406). In one embodiment, the system extracts a packet sequence number, packet sequence number valid bit, error messages, and special packet indicator from the packet header. The system waits for the EOF field to be received (operation 408) and, when it has been received, writes the extracted packet header information, including the sequence number, into a corresponding packet sequence-number FIFO header (operation 410).

Figure 4B:
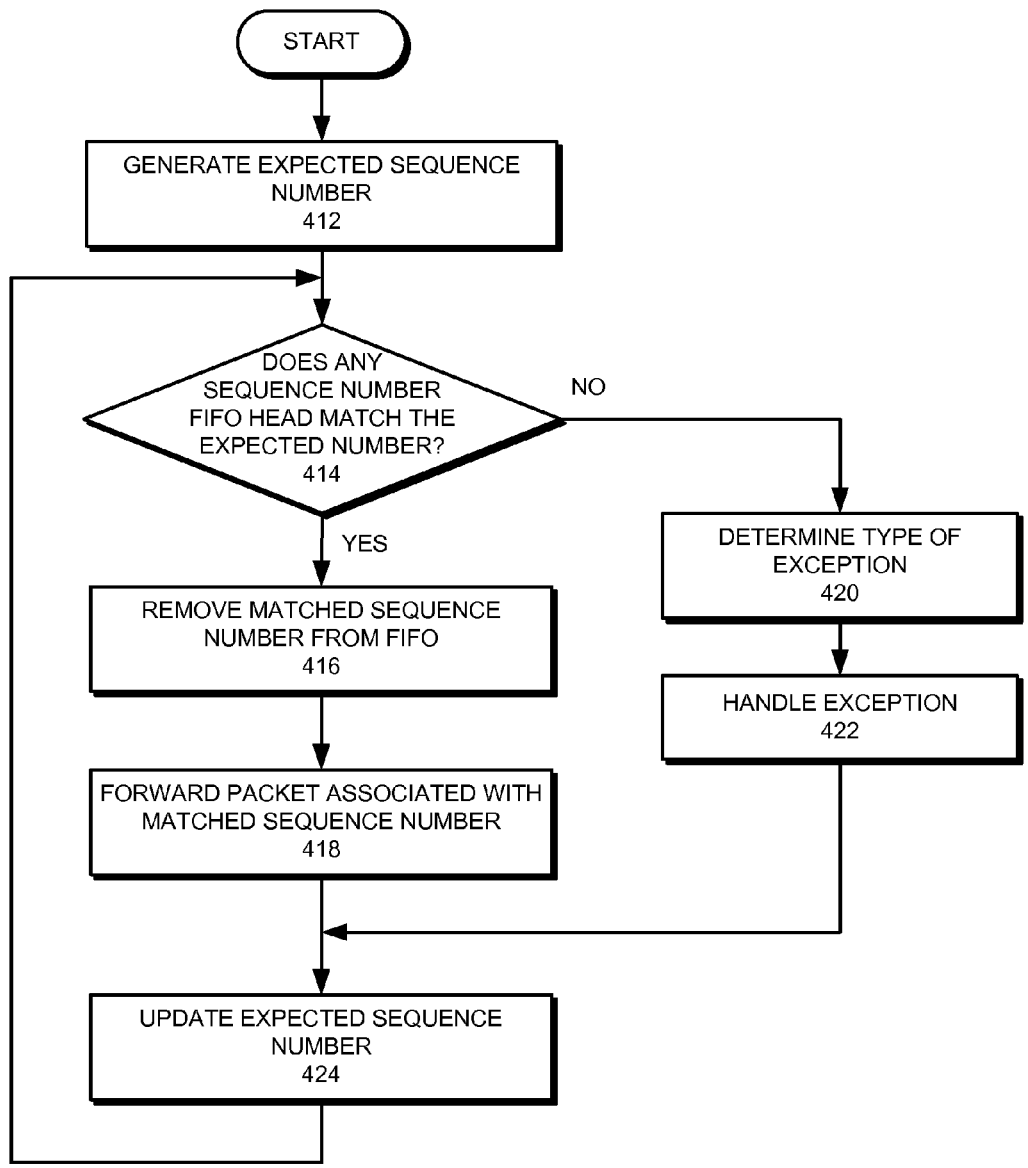
FIG. 4B presents a flowchart illustrating a process for in-order packet forwarding in accordance with an embodiment of the present invention.

FIG. 4B presents a flowchart illustrating a process for in-order packet forwarding in accordance with an embodiment of the present invention. During operation, the system generates an expected sequence number (operation 412) and determines whether the head of one of the sequence-number FIFO buffers matches the expected sequence number (operation 414). If so, the system removes the match packet sequence number from the sequence-number FIFO buffer (operation 416), and forwards the packet associated with the matched packet sequence number (which is the header of the corresponding store- and forward FIFO buffer) on the high-speed interface (operation 418). Note that, once the header of a FIFO buffer is removed, the next entry in the FIFO buffer moves up to become the next FIFO header. If not, the system determines which type of exception has occurred (operation 420), and handles it accordingly (operation 422). Subsequent to packet forwarding, the system updates the expected sequence number (operation 424), and compares it with new sequence-number FIFO headers (operation 414). In one embodiment, the system updates the expected sequence number by adding one to the sequence number of the most recently forwarded packet.

Handling Exceptions

Figure 5C:
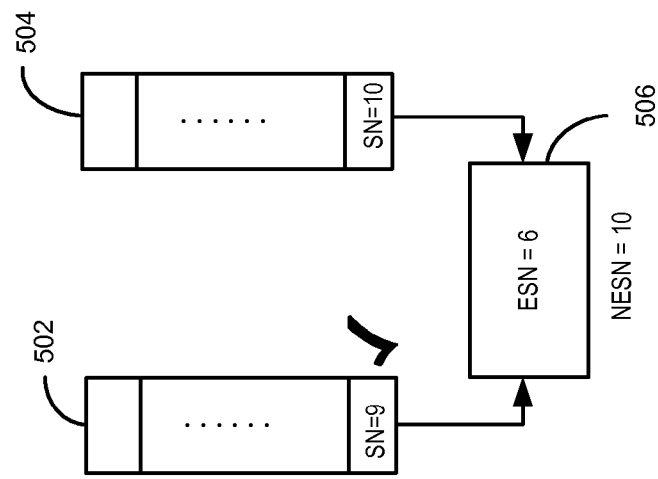
Figure 5B:
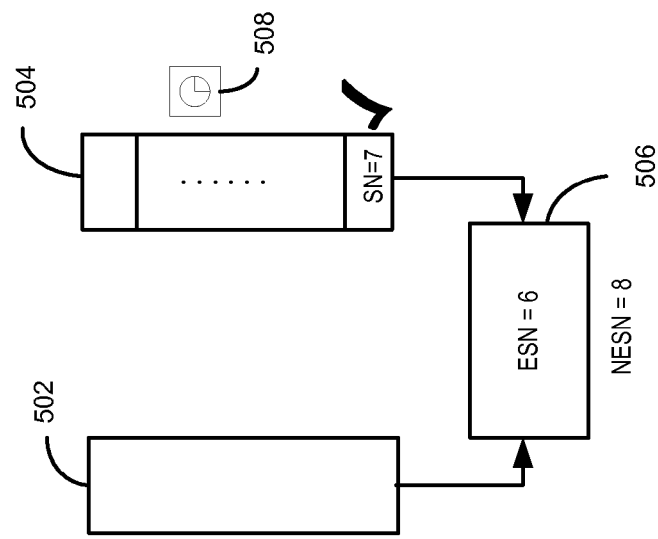
Figure 5A:
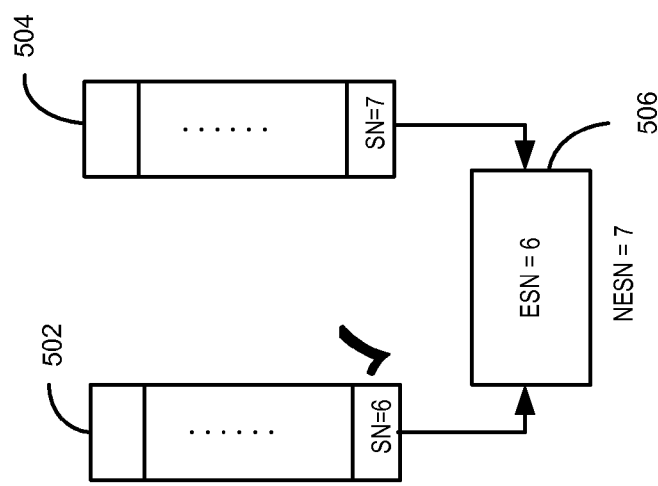
FIG. 5A illustrates an exemplary architecture of an edge device which facilitates multi-path switching with in-order data frame delivery in accordance with an embodiment of the present invention.

FIG. 5A illustrates an exemplary normal packet-forwarding arbitrating scenario in accordance with an embodiment of the present invention. In this example and the examples shown afterwards, for illustration purposes only, the system includes two low-speed interfaces. FIG. 5A illustrates two sequence-number FIFO buffers 502 and 504, each coupled to a low-speed interface. In the example shown in FIG. 5A, the expected sequence number (ESN) generated by arbitrator 506 is 6, the head of sequence-number FIFO buffer 502 is 6, and the head of buffer 504 is 7. Because the value of the head of sequence-number FIFO 502 matches that of the expected sequence number, arbitrator 506 selects FIFO 502, as shown by the check mark shown in FIG. 5A. As a result, a packet associated with the head of FIFO 502 is forwarded on the high-speed interface. After forwarding the packet, the arbitrator updates its next ESN (NESN) to 7.

Sometimes, none of the sequence-number FIFO head matches the expected sequence number. Such a scenario is considered an exception. In one embodiment, the system includes a mechanism configured to handle various exceptions. FIGS. 5B-5I present a number of exemplary scenarios illustrating how the system handles exceptions in accordance with embodiments of the present invention.

In the example shown in FIG. 5B, the expected sequence number (ESN) generated by arbitrator 506 is 6, sequence-number FIFO buffer 502 is empty, and the head of buffer 504 is 7. Because no match is found and one of the FIFOs is empty, the system waits for the arrival of the matched sequence number. To prevent prolonged delay and to avoid buffer overflow, each FIFO is equipped with a timer, or a timeout counter. When the system waits for the arrival of a match, the timer of the non-empty FIFO increments. For example, in FIG. 5B, a timer 508 associated with FIFO 504 increments while the system waits for a match. In one embodiment, a timeout event is triggered when timer 508 reaches a pre-programmed set value. In a further embodiment, a timeout event is triggered when the store-and-forward FIFO buffer associated with the sequence-number FIFO buffer of the timer is almost full or exceeds a predetermined threshold. Once timer 508 indicates that a timeout has occurred, arbitrator 506 selects FIFO 504, and forwards the packet whose sequence number is 7. To avoid unnecessary future timeouts, arbitrator 506 updates its NESN to 8 by adding 1 to the sequence number of the forwarded packet. Note that, if a match is found before the timeout event, the timer is reset. Also note that the pre-programmed set value for timer 508 can be controlled by an arbitrator controller, such as controller 322 in FIG. 3. In addition, controller 322 can also control the start and reset of timer 508.

In the example shown in FIG. 5C, the expected sequence number (ESN) generated by arbitrator 506 is 6, the head of sequence-number FIFO buffer 502 is 9, and the head of buffer 504 is 10. Note that none of the FIFOs is empty, and none of the FIFO head matches the ESN. This exception may be caused by a packet loss. In one embodiment, the system selects a FIFO whose head has a smaller value. In FIG. 5C, arbitrator 506 selects FIFO 502 and forwards a packet whose sequence number is 9. Subsequently, arbitrator 506 updates its NESN to 10 by adding 1 to the sequence number of the forwarded packet.

In the example shown in FIG. 5D, the expected sequence number (ESN) generated by arbitrator 506 is 6, sequence-number FIFO buffer 504 is empty, and the head of sequence-number FIFO buffer 502 indicates that either the associated packet is a flow-control PAUSE (PF) packet, or the associated packet contains an error. Examples of packet errors include, but are not limited to: shim header errors (SE), invalid sequence number bit sets, and sequence number parity check errors. Because in such a scenario comparison to the ESN is meaningless, the system simply forwards the PAUSE packet or the packet containing the error without further comparison. After packet forwarding, the NESN is set to the same as the ESN. Note that next valid comparison may need to wait for 3 clock cycles to get the updated valid data from sequence-number FIFO 502.

In the example shown in FIG. 5E, the expected sequence number (ESN) generated by arbitrator 506 is 6, the head of sequence-number FIFO buffer 504 is 9, and the head of buffer 502 indicates a PAUSE packet or a packet containing an error. In one embodiment, arbitrator 506 first forwards the PAUSE packet and keeps the NESN unchanged.

In the example shown in FIG. 5F, the expected sequence number (ESN) generated by arbitrator 506 is 6, sequence-number FIFO buffer 502 is empty, and the head of sequence-number FIFO buffer 504 is 5. Note that FIFO 504's head is smaller than the ESN, thus indicating some sort of error has occurred in the system or in the associated packet. Similarly, comparison to the ESN becomes pointless. Hence, the system simply forwards the packet whose sequence number is smaller than the ESN and keeps the NESN unchanged.

When the number of PAUSE and/or error packets increases, in order to handle the exceptions with fairness toward all ETMs, the system can implement a round-robin mechanism when more than one sequence-number FIFO buffer indicates PAUSE and/or error packets. FIGS. 5G-5I illustrate such scenarios. In one embodiment, the system maintains a round-robin (RR) bit for each ETM. If the RR bit is set to 1, the corresponding ETM has priority when both sequence-number FIFO buffers indicate PAUSE and/or error packets.

In the example shown in FIG. 5G, the expected sequence number (ESN) generated by arbitrator 506 is 6, both the heads of sequence-number FIFO buffers 502 and 504 indicate a PAUSE packet or a packet containing an error. Because the RR bit corresponding to FIFO 502 is set as 1, arbitrator 506 forwards the packet associated with the head of FIFO 502. The NESN is kept unchanged.

In the example shown in FIG. 5H, the head of sequence-number FIFO buffer 502 is 4, and the head of buffer 504 is 5. Note that both FIFO heads are smaller than the ESN, thus indicating an error. In FIG. 5H, the RR bit corresponding to FIFO 504 is set as 1. Consequently, arbitrator 506 forwards the packet whose sequence number is 5. The NESN is kept unchanged.

In the example shown in FIG. 5I, the head of sequence-number FIFO buffer 502 is 5, and the head of sequence-number FIFO buffer 504 indicates a PAUSE packet or a packet containing an error. Because in FIG. 5I, the RR bit corresponding to FIFO 502 is set as 1, arbitrator 506 selects FIFO 502. As a result, the packet whose sequence number is 5 is forwarded on the high-speed interface.

Note that although in the examples described here there are only two parallel paths where packets and their corresponding sequence numbers are buffered, embodiments of the present invention any employ any number, such as 3, 4, or 8, of paths to buffer the data and to sort the sequence numbers.

The examples presented herein are for illustration purposes only and should not limit the scope of this disclosure. In general, embodiments of the present invention provide a new type of arbitrating mechanism which facilitates in-order traffic aggregation. Such a novel arbitrating mechanism maintains a minimum usage of buffer space, thus alleviating the need for a large memory.

This new arbitrating system is different from conventional link aggregation (such as Ethernet link aggregation or FC link aggregation), because it can guarantee in-order frame delivery without measuring link latencies.

The data structures described in this detailed description are typically stored on a computer-readable storage medium, which may be any device or medium that can store code and/or data for use by a computer system. This includes, but is not limited to, application-specific integrated circuits (ASIC), field-programmable gate arrays (FPGA), volatile memory, non-volatile memory, magnetic and optical storage, or other media capable of storing computer-readable media now known or later developed.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method comprising:
    storing a plurality of received packets in a set of packet buffers;
    converting a bit width of the received packets to a higher bit width;
    identifying runt packets and flow-control packets from the received packets;
    extracting packet sequence numbers and a sequence number valid bit from the received packets; and
    in response to no sequence number matching an expected sequence number and a timeout event, removing a head entry having a smallest sequence-number value from a set of sequence number buffers.

2. The method of claim 1, wherein the timeout event comprises at least one of the following events:
    a waiting time exceeds a predetermined amount; and
    a buffer exceeds a predetermined threshold.

3. The method of claim 1, further comprising:
    in response to a received packet containing an error, forwarding the received packet; and
    keeping the expected sequence number unchanged.

4. The method of claim 3, wherein the error includes at least one of:
    an invalid sequence number;
    a packet header checksum error;
    a sequence number parity error; and
    a sequence number smaller than the expected sequence number.

5. The method of claim 1, further comprising:
    in response to receiving a flow-control packet, forwarding the received flow-control packet; and
    keeping the expected sequence number unchanged.

6. The method of claim 5, wherein forwarding the received flow-control packet is performed in a round-robin fashion among a number of input ports.

7. The method of claim 1, further comprising determining whether an end-of-frame (EOF) field associated with a particular packet is received, and wherein storing a sequence number of the particular packet occurs after the EOF field is received.

8. The method of claim 1, further comprising storing the sequence numbers associated with the received packets in the set of sequence-number buffers.

9. The method of claim 1, further comprising generating the expected sequence number based on a previously forwarded packet.

10. The method of claim 1, further comprising determining whether a match exists between head entries of the set of sequence-number buffers and the expected sequence number.

11. The method of claim 1, further comprising:
 retrieving a packet corresponding to the removed head entry from a corresponding packet buffer; and
 forwarding the retrieved packet.

12. A system comprising:
 a set of packet buffers configurable to store a plurality of received packets,
 a packet parser operable to:
  convert a bit width of the received packets to a higher bit width;
  identify runt packets and flow-control packets from the received packets; and
  extract packet sequence numbers and a sequence number valid bit from the received packets; and
 a sequence-number managing module operable to, in response to no sequence number matching an expected sequence number and a timeout event, remove a head entry having a smallest sequence-number value from a set of sequence-number buffers.

13. The system of claim 12, wherein the timeout event comprises at least one of the following events:
 a waiting time exceeding a predetermined amount; and
 a buffer exceeding a predetermined threshold.

14. The system of claim 12, further comprising a packet forwarding module, wherein, in response to a received packet containing an error, the packet forwarding module is operable to forward the received packet while the expected sequence number is kept unchanged.

15. The system of claim 14, wherein the error includes at least one of:
 an invalid sequence number;
 a packet header checksum error;
 a sequence number parity error; and
 a sequence number smaller than the expected sequence number.

16. The system of claim 12, further comprising a packet forwarding module, wherein, after a flow-control packet is received, the packet forwarding module is operable to forward the received flow-control packet while the expected sequence number is kept unchanged.

17. The system of claim 16, wherein the packet forwarding module is operable to forward the received flow-control packet in a round-robin fashion among a number of input ports.

18. The system of claim 12, further comprising a sequence-number buffer operable to store a packet-sequence number after an end-of-frame field is received.

19. The system of claim 12, further comprising the set of sequence-number buffers operable to store the sequence numbers associated with the received packets.

20. The system of claim 12, further comprising a sequence-number generation module operable to generate the expected sequence number based on a previously forwarded packet.

21. The system of claim 12, further comprising a determination module operable to determine whether a match exists between head entries of the set of sequence-number buffers and the expected sequence number.

22. The system of claim 12, further comprising a packet forwarding module operable to:
 retrieve a packet corresponding to the removed head entry from a corresponding packet buffer; and
 forward the retrieved packet.

23. A switching means, comprising:
 a packet buffering means for storing a plurality of received packets in a set of packet buffers;
 a packet-parsing mechanism for:
 converting a bit width of the received packets to a higher bit width;
 identifying runt packets and flow-control packets from the received packets; and
 extracting packet sequence numbers and a sequence number valid bit from the received packets; and
 a sequence-number managing means for removing a head entry having a smallest sequence-number entry from a set of sequence-number buffers in response to no sequence number matching an expected sequence number and a timeout event.

24. The means of claim 23, further comprising a sequence-number generating means for generating the expected sequence number based on previously forwarded packets.

* * * * *